United States Patent [19]

Friedemann et al.

[11] Patent Number: 4,755,226
[45] Date of Patent: Jul. 5, 1988

[54] SEALING AND/OR STABILIZING AND/OR BINDING PREPARATIONS COMPRISING ALKALI METAL SILICATE SOLUTIONS

[75] Inventors: Wolfgang Friedemann, Neuss; Wolfgang Pesch, Grevenbroich; Kurt Feulner, Essen, all of Fed. Rep. of Germany

[73] Assignee: Henkel Kommanditgesellschaft auf Aktien, Duesseldorf, Fed. Rep. of Germany

[21] Appl. No.: 11,174

[22] Filed: Feb. 5, 1987

[30] Foreign Application Priority Data

Feb. 5, 1986 [EP] European Pat. Off. ........ 86101482.7

[51] Int. Cl.⁴ ............................................. C04B 12/04
[52] U.S. Cl. ....................................... 106/84; 106/74; 106/900; 405/266; 405/270
[58] Field of Search ........................... 106/74, 84, 900; 405/266, 270

[56] References Cited

U.S. PATENT DOCUMENTS

| | | | |
|---|---|---|---|
| 3,028,340 | 4/1962 | Gandon et al. | 106/84 |
| 3,493,406 | 2/1970 | Fillet et al. | 106/74 |
| 4,171,986 | 10/1979 | Freyhold et al. | 106/74 |
| 4,293,340 | 10/1981 | Metz | 106/74 |

FOREIGN PATENT DOCUMENTS

1166581  6/1958  France .

*Primary Examiner*—Steven Capella
*Attorney, Agent, or Firm*—Ernest G. Szoke; Henry E. Millson, Jr.; Real J. Grandmaison

[57] ABSTRACT

Sealing and/or stabilizing and/or binding preparations comprising modified alkali metal silicate solutions having a molar ratio of $SiO_2$ to $Me_2O$ of from 2 to 4.5 wherein Me represents sodium or potassium; sodium metaborate and/or potassium metaborate in a molar ratio of $SiO_2$ to $B_2O_3$ of from 5 to 400; and glyoxal, and to the use of these preparations.

20 Claims, No Drawings

SEALING AND/OR STABILIZING AND/OR BINDING PREPARATIONS COMPRISING ALKALI METAL SILICATE SOLUTIONS

BACKGROUND OF THE INVENTION

1. Field of the Invention

This invention relates to preparations comprising modified alkali metal silicate solutions for sealing and/or stabilizing and/or binding, to the use of these preparations, and to a process for sealing and/or stabilizing and/or binding using these preparations.

Preparations based on aqueous alkali metal silicate solutions have long been known and are widely used in practice, for example in the stabilization and sealing of ground and soils. In tunnel construction and underground railway construction, for example, alkali metal silicate solutions are injected into the ground to stabilize the soil and to underpin already erected buildings and to stabilize the ground. In addition, aqueous alkali metal silicate solutions may be used for stabilizing building materials and masonry and as a binder for moldings consisting of minerals.

Where alkali metal silicate solutions are used without additives, they are often unable to satisfy technical requirements. Thus, hardness, elasticity and resistance to temperatures and water are frequently inadequate. Because of this, numerous proposals have already been put forward with a view to improving the properties of alkali metal silicate solutions. In particular, hardeners of various kinds, for example, glyoxal or dicarboxylic acid esters, have been used.

2. Description of Related Art

France Patent No. 1,166,581 describes the use of glyoxal as a hardener for alkali metal silicate solutions. Unfortunately, the rapid reaction between concentrated alkali metal silicate solutions and the glyoxal seriously restricts potential applications.

It is also known that the reaction velocities of alkali metal silicate solutions containing hardeners can be reduced as required by dilution with water, i.e., by reducing their solids content. Unfortunately, this gives rise to the disadvantage that, for example, the stabilization of soils and/or mineral building materials and molding materials is not sufficient so that potential applications are seriously restricted again.

U.S. Pat. No. 4,293,340 describes soil-stabilizing preparations containing aqueous alkali metal silicate solutions, glyoxal and hydrogen peroxide and, optionally, inorganic salts. The inorganic salts used are those belonging to groups I to III, more especially sodium aluminate, aluminium chloride, copper sulfate, zinc chloride and calcium chloride, calcium chloride being preferred. However, soil stabilized with preparations such as these shows inadequate compressive strength.

U.S. Pat. No. 3,493,406 describes a process for stabilizing soils using an aqueous silicate solution containing an addition of a gel-forming agent. The gel-forming agent used is a mixture of succinic acid dialkyl ester with dialkyl esters of homologous higher carboxylic acids, such as glutaric acid and/or adipic acid. The disadvantage of preparations such as these is that, after they have been introduced into the soil, ground waters and soil are polluted by large quantities of organic substances which have to be degraded. This type of pollution is measured as "chemical oxygen demand" (COD-value).

U.S. Pat. No. 4,171,986 describes binders based on alkali metal silicate solutions having a reduced setting time and improved water resistance. These binders based on alkali metal silicate solutions with a molar ratio of $SiO_2$ to $Me_2O$ of from 1.8 to 4.0 and a solids content of from 20 to 55% by weight are characterized by a content of potassium metaborate, the molar ratio of $SiO_2$ to potassium metaborate being in the range of from 0.1 to 50. However, the advantages obtainable with binders such as these, i.e., the high water resistance and, in particular, the increased setting rate, cannot be obtained with sodium metaborate, as can be seen from Example 1 and Comparison Examples E and F described in German Application No. 27 14 889.

The problem which the present invention seeks to solve is to eliminate the above-mentioned disadvantages of the prior art by modifying the alkali metal silicate solutions and, in particular, to provide alkali metal silicate solutions which have sufficiently long gelling times and hardening times for practical application, even at high solids contents.

According to the invention, this problem is solved by the provision of sealing, stabilizing and binding agents comprising modified alkali metal silicate solutions.

DESCRIPTION OF THE INVENTION

Other than in the operating examples, or where otherwise indicated, all numbers expressing quantities of ingredients or reaction conditions used herein are to be understood as modified in all instances by the term "about".

The present invention relates to sealing and/or stabilizing and/or binding preparations comprising modified alkali metal silicate solutions having a molar ratio of $SiO_2$ to $Me_2O$ of from 2 to 4.5 wherein Me represents sodium or potassium, sodium metaborate and/or potassium metaborate in a molar ratio of $SiO_2$ to $B_2O_3$ of from 5 to 400, and glyoxal.

In the light of the prior art, particularly France Patent No. 1,166,581 and U.S. Pat. No. 4,171,986, it is surprising that the preparations according to the invention which contain alkali metal silicate solutions in combination with sodium metaborate and/or potassium metaborate and with glyoxal retard setting thereof, even at high solids contents, i.e., the combination of two waterglass hardeners or accelerators generally produces a delay in hardening. However, the preparations according to this invention show an increased gelling time and hardening time, even at high solids contents.

Neither the use of glyoxal alone nor the use of alkalizing agents, such as for example sodium hydroxide, potassium hydroxide or amines, or of other borates, such as potassium tetraborate for example, produced the desired effect, as is apparent from the following Comparison Examples.

The preparations according to the invention preferably contain alkali metal silicates having $SiO_2$: $Me_2O$ molar ratios of from 3.0 to 4.0.

In the preparations according to this invention, the $SiO_2$ : $B_2O_3$ molar ratio is preferably from 7 to 60.

The glyoxal is used in the preparations according to the invention in quantities of from 0.4% by weight to 12% by weight, and preferably in quantities of from 1.5% by weight to 7% by weight, based on the weight of the preparations. Glyoxal of commercial quality is preferably used. A suitable glyoxal of commercial quality is, for example, the Hoechst product Glyflx ® CS 50.

In the preparations according to the invention, the $SiO_2$ concentration of the ready-to-use alkali metal silicate solutions is at most 30% by weight.

The preparations according to the invention may be used for sealing or stabilizing sandy soils. The preparations are also suitable for sealing and/or stabilizing mineral building materials, for example concrete, mineral slabs and also masonry. In addition, the preparations according to the invention are also suitable for use as binders for mineral moldings, for example, of the type used in foundries.

Accordingly, the present invention also relates to the use of the preparations according to the invention for sealing and/or stabilizing soils, for sealing and/or stabilizing mineral building materials, such as concrete, masonry, mineral slabs and the like, and for binding mineral moldings.

The invention also relates to processes for sealing and/or stabilizing soils, mineral building materials and for binding mineral moldings, characterized in that the preparations according to the invention are used.

Compared with the use of hardener mixtures according to the prior art, of the type described for example in U.S. Pat. No. 3,493,406, the use of the preparations according to the invention produces far less pollution of the ground and soil and hence of the ground water with organic constituents. This is reflected in greatly reduced COD (chemical oxygen demand) values as shown in Comparison Example 4 herein.

The invention is illustrated by the following Examples.

I. Soil stabilization by silicate gel injections

In silicate gel injection, the gelling time of the ready-to-use injection solution and the degree of stabilization of the injected soils are measures of the quality and suitability of the products. In the following examples, therefore, these criteria were determined and compared with practical requirements such as gelling time of 30 to 60 minutes, and compressive strength of $\geq 200$ N/cm$^2$ (Newton/cm$^2$). The gelling time was determined by placing 100 ml of injection solution in a polyethylene beaker at room temperature, without cooling, on a magnetic stirrer adjusted to stage 3. The time required for the stirring rod to be brought to a standstill by the onset of gelation was measured.

To determine compressive strength, 200 grams of dry quartz sand (F32) was compressed into cylindrical test specimens having a diameter of 50 mm, a height of 60 mm, and a density of 1.7 g/cm$^3$. The injection solution was then injected from below until the liquid level had reached the surface of the test specimen. After hardening of the test specimens, which required about 5 hours, they were removed from their molds and were stored for 7 days at room temperature, i.e., about 21° to 22° C., in a hermetically sealed plastic beaker pending the compressive strength test.

The compressive strength of the test specimens was determined using a test apparatus of the type made by Georg Fischer AG, Postfach 689, CH-8201 Schaffhausen.

The commercial waterglass solutions soda waterglass HK30 having an SiO$_2$ content of 22.01%, an Na$_2$O content of 5.67%, a density of 1261 kg/m$^3$ at 20° C., a viscosity of 18 mPas at 20° C., and an SiO$_2$:Na$_2$O molar ratio of 4.0; and soda waterglass 37/40 having an SiO$_2$ content of 26.66%, an Na$_2$O content of 7.94%, a density of 1349 kg/m$^3$ at 20° C., a viscosity of 56 mPas at 20° C., and an SiO$_2$:Na$_2$O molar ratio of 3.46 were used for Examples 1 to 7.

EXAMPLE I 900 ml of the afore-described soda waterglass HK30 were mixed with 30 ml of softened water, 20 ml of a 41% potassium metaborate solution having a density of 1.493 g/cm$^3$, and 50 ml of a 40% glyoxal solution having a density of 1.270 g/cm$^3$ to make 1000 ml of injection solution. This ready-to-use silicate solution contained 19.85% SiO$_2$ and 0.41% B$_2$O$_3$, providing an SiO$_2$ to B$_2$O$_3$ molar ratio of 55.7.

The gelling time, as measured with the magnetic stirrer, was 40 minutes and the compressive strength of the test specimen was 207 N/cm$^2$. By comparison, a metaborate-free mixture (900 ml soda waterglass HK30 mixed with 50 ml softened water and 50 ml of a 40% glyoxal solution) produced a gelling time of 21 minutes, as measured with the magnetic stirrer, and a compressive strength of the test specimen of 202 N/cm$^2$. The gelling time of the metaborate-free injection solution was not long enough for practical purposes.

EXAMPLE II 700 ml of the afore-described soda waterglass 37/40 were mixed with 186.5 ml of softened water, 33.5 ml of a 41% potassium metaborate solution having a density of 1.493 g/cm$^3$ and 80 ml of a 40% glyoxal solution having a density of 1.270 g/cm$^3$ to make 1000 ml of injection solution. This ready-to-use injection solution contained 19.63% SiO$_2$ and 0.68% B$_2$O$_3$, providing an SiO$_2$ to B$_2$O$_3$ molar ratio of 33.6.

The gelling time, as measured with the magnetic stirrer, was 43 minutes and the compressive strength of the test specimen was 272 N/cm$^2$. By comparison, a metaborate-free mixture of 700 ml soda waterglass 37/40, 220 ml of softened water and 80 ml of the 40% glyoxal solution produced a gelling time of 16 minutes and a compressive strength of the test specimen of 251 N/cm$^2$. Once again, the gelling time of this metaborate-free injection solution was not long enough for practical purposes.

EXAMPLE III 900 ml of soda waterglass HK30 were mixed with 35 ml of softened water, 30 ml of a 41% potassium metaborate solution having a density of 1.493 g/cm$^3$ and 35 ml of a commercial glyoxal solution (Glyfix CS 50, a product of Hoechst France) having a density of 1.41 g/cm$^3$ to make 1000 ml of injection solution. This ready-to-use injection solution contained 19.76% SiO$_2$ and 0.62% B$_2$O$_3$, providing an SiO$_2$ to B$_2$O$_3$ molar ratio of 37.

The gelling time was 44 minutes and the compressive strength of the test specimen was 205 N/cm$^2$. By comparison, a metaborate-free injection solution of 900 ml soda waterglass HK30, 65 ml of softened water and 35 ml of commercial glyoxal solution (Glyfix CS 50, a product of Hoechst France, density =1.41 g/cm$^3$) produced a gelling time of 20 minutes and a compressive strength of the test specimen of 200 N/cm$^2$. The gelling time of the metaborate-free injection solution was not long enough for practical purposes.

EXAMPLE IV 1000 ml of injection solution were prepared from 700 ml of soda waterglass 37/40, 200 ml of softened water, 40 ml of a 41% potassium metaborate solution having a density of 1.493 g/cm$^3$ and 60 ml of a commercial glyoxal solution (Glyfix CS 50, a product of Hoechst France) having a density of 1.41 g/cm$^3$. This ready-to-use injection solution contained 19.54% SiO$_2$ and 0.81% B$_2$O$_3$, providing an SiO$_2$ to B$_2$O$_3$ molar ratio of 28.

The gelling time was 39 minutes and the compressive strength of the test specimen was 264 N/cm$^2$. By comparison, a metaborate-free injection solution of 700 ml soda waterglass 37/40, 240 ml of softened water and 60 ml of a commercial glyoxal solution (Glyfix CS 50, a product of Hoechst France) having a density of 1.410 g/cm$^3$ produced a gelling time of 16 minutes and a compressive strength of the test specimen of 248 N/cm$^2$. Once again, the gelling time was not long enough for practical purposes.

EXAMPLE V 1000 ml of injection solution were prepared from 700 ml soda waterglass 37/40, 197.7 ml of softened water, 42.3 ml of a 32.9% sodium metaborate solution having a density of 1.413 g/cm$^3$ and 60 ml of commercial glyoxal solution (Glyfix CS 50, a product of Hoechst France) having a density of 1.41 g/cm$^3$. The injection solution contained 19.57% SiO$_2$ and 0.81% B$_2$O$_3$ and had an SiO$_2$ to B$_2$O$_3$ molar ratio of 28.

The gelling time of this injection solution was 42 minutes and the compressive strength of the test specimen was 260 N/cm$^2$.

EXAMPLE VI 1000 ml of injection solution were prepared from 700 ml soda waterglass 37/40, 198.7 ml of softened water, 21.2 ml of a 32.9% sodium metaborate solution having a density of 1.413 g/cm$^3$, 20.1 ml of a 41% potassium metaborate solution having a density of 1.493 g/cm$^3$ and 60 ml of commercial glyoxal (Glyfix CS 50, a product of Hoechst France) having a density of 1.41 g/cm$^3$. The solution contained 19.55% SiO$_2$ and 0.81% B$_2$O$_3$ and had an SiO$_2$ to B$_2$O$_3$ molar ratio of 28.

The gelling time was 37 minutes and the compressive strength of the molding was 262 N/cm$^2$.

EXAMPLE VII 1000 ml of injection solution were prepared from 900 ml soda waterglass HK30, 34.1 ml of softened water, 15.0 ml of a 41% potassium metaborate solution having a density of 1.493 g/cm$^3$, 15.9 ml of a 32.9% sodium metaborate solution having a density of 1.413 g/cm$^3$ and 35 ml of a commercial glyoxal solution (Glyfix CS 50, a product of Hoechst France) having a density of 1.41 g/cm$^3$. The injection solution contained 19.77% SiO$_2$ and 0.62% B$_2$O$_3$ and had a SiO$_2$ to B$_2$O$_3$ molar ratio of 37.

The gelling time of this solution was 45 minutes and the compressive strength of the test specimen was 204 N/cm$^2$.

The following three Comparison Examples are intended to show that the desired increase in the gelling time cannot be achieved by using unclaimed borates or simple bases such a potassium hydroxide or triethanolamine.

COMPARISON EXAMPLE 1

1000 ml of injection solution were prepared from 700 ml soda waterglass 37/40, 193 ml of softened water, 47 ml of a 29.2% potassium tetraborate solution having a density of 1.279 g/cm$^3$ and 60 ml of commercial glyoxal solution (Glyfix CS 50, a product of Hoechst France).

The injection solution contained 19.64% SiO$_2$ and 0.82% B$_2$O$_3$ and had an SiO$_2$ to B$_2$O$_3$ molar ratio of 28.

The gelling time of this injection solution was 20 minutes and was therefore not long enough for practical purposes.

COMPARISON EXAMPLE 2

700 ml soda waterglass 37/40 were mixed with 200.5 ml of softened water, 39.5 ml of a 28% potassium hydroxide solution having a density of 1.269 g/cm$^3$ and 60 ml of a commercial glyoxal solution (Glyfix CS 50, a product of Hoechst France) to make 1000 ml of injection solution. The injection solution contained 19.68% SiO$_2$.

The gelling time was 21 minutes and was therefore not long enough for practical purposes. A test specimen could not be prepared because the gel formed was soft.

COMPARISON EXAMPLE 3

700 ml soda waterglass 37/40 were mixed with 210 ml of softened water, 30 ml of a 20% triethanolamine solution having a density of 1.032 g/cm$^3$ and 60 ml of a commercial glyoxal solution (Glyfix CS 50, a product of Hoechst France) were mixed to make 1000 ml of injection solution. The solution contained 19.82% SiO$_2$ and 0.49% triethanolamine.

The gelling time of the injection solution was 14 minutes and was therefore not long enough for practical purposes.

COMPARISON EXAMPLE 4

Determination of chemical oxygen demand (COD value)

Comparative COD determinations were carried out using test specimens which had been prepared, on the one hand, with the preparation according to the invention and, on the other hand, with a state-of-the-art preparation.

The test specimens were prepared in the same way as generally described in Example 1.

The injection solutions used corresponded
(a) to Example 3 according to the invention,
(b) to a waterglass solution containing a known hardener mixture corresponding to the following particulars: 57.45 ml soda waterglass 37/40 were mixed at room temperature (21°-22° C.) with 11.9 ml of softened water and 9.69 ml of a dicarboxylic acid ester mixture (Durcisseur ® 1000, a product of Rhone Poulenc).

The composition of the injection solutions used was selected so that comparable gelling times and strengths of the test specimens were obtained.

After storage for 7 days in the absence of air, the test specimens thus obtained were placed on a perforated VA steel pedestal having a length of 55 mm and a height of 20 mm which was in turn placed in a 1 liter polyethylene cup, 900 ml of distilled water were then added, the polythene cup was sealed and the water stirred by means of a magnetic stirrer (stage 5-7).

50 ml samples of the eluates were taken from the polythene cups after 1 hour, 8 hours, 24 hours and 3 days without the starting solution being topped up.

The chemical oxygen demand was determined in mg O$_2$/l by the Dr. Lange cell test LCK 114 (for 150 mg to 1000 mg O$_2$/l) (Dr. Bruno Lange GmbH, Berlin).

The values obtained are shown in the following Table 1.

TABLE 1

| | COD values in mg O₂/l of the eluates of test specimens | | | | | |
|---|---|---|---|---|---|---|
| Injection solution | Gelling time (mins.) | Compressive Strength (N/cm$^2$) | COD values after | | | |
| | | | 1 hr. | 8 hrs. | 24 hrs. | 3 days |
| (a) Invention | 44 | 205 | 212 | 498 | 1230 | 1628 |
| (b) Comparison | 42 | 215 | 837 | 2244 | 7689 | 11382 |

The COD-values obtained show that the use of the injection solution according to the invention leads to considerably lower values and hence to considerably less pollution of the ground water and of the soil than the use of injection solutions corresponding to the prior art.

II. Stabilization and sealing of mineral building materials

In the sealing of mineral building materials, for example masonry, a long gelling time is again required for as high a solids content as possible. In this way, the solution penetrates more deeply into the masonry and produces the desired effect.

Potash waterglass 28/30 having an SiO$_2$ content of 21.04%; K$_2$O content of 8.23%; a density of 1256 kg/m$^3$ and a viscosity of 44 mPas was used for Examples VIII to XI. Density and viscosity were measured at 20° C.; the SiO$_2$:K$_2$O molar ratio was 4.01.

EXAMPLE VIII 140 g potash waterglass 28/30 were mixed with 51.5 g of softened water, 0.5 g of 41% potassium metaborate solution having a density of 1.493 g/cm$^3$, and 8 g of commercial glyoxal solution (Glyfix CS 50, a product of Hoechst France) to make 200 g of injection solution. The injection solution contained 14.73% SiO$_2$ and 0.044% B$_2$O$_3$ and had an SiO$_2$:B$_2$O$_3$ molar ratio of 388. The gelling time of this injection solution was 30 minutes.

EXAMPLE IX 140 g potash waterglass 28/30 were mixed with 51 g of softened water, 1 g of 41% potassium metaborate solution having a density of 1.493 g/cm$^3$ and 8 g of commercial glyoxal solution (Glyfix CS 50, a product of Hoechst France) to make 200 g of injection solution. The injection solution contained 14.73% SiO$_2$ and 0.088% B$_2$O$_3$ and had an SiO$_2$:B$_2$O$_3$ molar ratio of 194.

The gelling time of this injection solution was 37 minutes.

EXAMPLE X 140 g potash waterglass 28/30 were mixed with 43 g of softened water, 9 g of a 41% potassium metaborate solution having a density of 1.493 g/cm$^3$ and 8 g of a commercial glyoxal solution (Glyfix CS 50, a product of Hoechst France) to make 200 g of injection solution. The injection solution contained 14.73% SiO$_2$ and 0.78% B$_2$O$_3$ and had an SiO$_2$:B$_2$O$_3$ molar ratio of 21.8.

The gelling time of this injection solution was 210 minutes.

If the gelling times of the injection solutions having increasing metaborate contents are compared with the gelling time of a metaborate-free injection solution of 140 g potash waterglass 28/30, 52 g of softened water and 8 g of commercial glyoxal solution (Glyfix CS 50, a product of Hoechst France), the metaborate-free solution is found to have a comparatively short gelling time of 23 minutes.

EXAMPLE XI 120 g potash waterglass 28/30 were mixed with 65 g of softened water, 8 g of a 41% potassium metaborate solution having a density of 1.493 g/cm$^3$ and 7 g of a commercial glyoxal solution (Glyfix CS 50, a product of Hoechst France) to make 200 g of injection solution. The injection solution contained 12.62% SiO$_2$ and 0.7% B$_2$O$_3$ and had an SiO$_2$:B$_2$O$_3$ molar ratio of 20.9.

This injection solution had a gelling time of 8 hours and may therefore be fully used during a work shift. By comparison, a metaborate-free injection solution of 120 g potash waterglass 28/30, 73 g of softened water and 7 g of a commercial glyoxal solution (Glyfix CS 50, a product of Hoechst France) had a gelling time of 40 minutes.

III. Production of binders for mineral moldings

The use of silicate binders in foundries is known. An ideal binder is one which has long open times in the premix; occasionally, however, these open times may also be below 30 minutes. Soda waterglass 48/50 containing 33.41% SiO$_2$, 12.11% Na$_2$O, having an SiO$_2$:Na$_2$O molar ratio of 2.84, a density of 1518 kg/m$^3$ and a viscosity of 2263 mPas (20° C.); and soda waterglass 43/45 containing 31.36% SiO$_2$, 10.17% Na$_2$O, having an SiO$_2$:Na$_2$O molar ratio of 3.18, a density of 1449 kg/m$^3$ (20° C.) and a viscosity of 975 mPas (20° C.) were used in Examples XII to XIV.

EXAMPLE XII 100 g soda waterglass 48/50 were mixed with 10 g of softened water, 4.1 g of potassium metaborate and 13.4 g of a commercial glyoxal solution (Glyfix CS 50, a product of Hoechst France) to make 127.5 g of binder containing 26.2% SiO$_2$ and 1.39% B$_2$O$_3$. The binder had an SiO$_2$ to B$_2$O$_3$ molar ratio of 21.9. The gelling time of the binder was 10 minutes. By comparison, a metaborate-free binder of 100 g soda waterglass 48/50, 10 g of softened water and 13.4 g of a commercial glyoxal solution (Glyfix CS 50, a product of Hoechst France) had a gelling time of only 5.5 minutes.

EXAMPLE XIII 100 g soda waterglass 43/45 were mixed with 10 g of softened water, 8.2 g of potassium metaborate and 12 g of a commercial glyoxal solution (Glyfix CS 50, a product of Hoechst France) to make 130.2 g of binder containing 24.1% SiO$_2$ and 2.67% B$_2$O$_3$. The binder had a molar ratio of SiO$_2$ to B$_2$O$_3$ of 10.5 and a gelling time of 18 minutes. By comparison, a metaborate-free binder of 100 g soda waterglass 43/45, 10 g of softened water and 12 g of a commercial glyoxal (Glyfix CS 50, a product of Hoechst France) had a gelling time of 5.5 minutes.

EXAMPLE XIV 100 g soda waterglass 43/45 were mixed with 5 g of softened water, 12.3 g of potassium metaborate and 14.1 g of a commercial glyoxal solution (Glyfix CS 50, a product of Hoechst France) to make 131.4 g of binder containing 23.87% $SiO_2$ and 3.98% $B_2O_3$. The binder had an $SiO_2$ to $B_2O_3$ molar ratio of 7 and a gelling time of 18 minutes. By contrast, a metaborate-free binder of 100 g soda waterglass 43/45, 5 g of softened water and 14.1 g of a commercial glyoxal solution (Glyfix CS 50, a product of Hoechst France) had a gelling time of 3.5 minutes.

We claim:

1. A sealing, stabilizing, and binding preparation comprising a modified alkali metal silicate solution, said alkali metal silicate solution having a molar ratio of $SiO_2$ to $Me_2O$ of from about 2 to about 4.5, wherein Me represents sodium or potassium; sodium metaborate and/or potassium metaborate in a molar ratio of $SiO_2$ to $B_2O_3$ of from about 5 to about 400; and glyoxal; said $SiO_2$ being present in a quantity of up to about 30% by weight, and said glyoxal being present in a quantity of from about 0.4% to about 12% by weight, based on the weight of said preparation.

2. A preparation in accordance with claim 1 wherein said molar ratio of $SiO_2$ to $Me_2O$ is from about 3.0 to about 4.0.

3. A preparation in accordance with claim 1 wherein said molar ratio of $SiO_2$ to $B_2O_3$ is from about 7 to about 60.

4. A preparation in accordance with claim 1 wherein said glyoxal is present in a quantity of from about 1.5% by weight to about 7% by weight, based on the weight of said preparation.

5. The process of sealing and stabilizing soil or a mineral building material, or binding a mineral molding comprising contacting said soil, mineral building material, or mineral molding with an alkali metal silicate solution, said alkali metal silicate solution having a molar ratio of $SiO_2$ to $Me_2O$ of from about 2 to about 4.5 wherein Me represents sodium or potassium; sodium metaborate and/or potassium metaborate in a molar ratio of $SiO_2$ to $B_2O_3$ of from about 5 to about 400; and glyoxal.

6. The process in accordance with claim 5 wherein said molar ratio of $SiO_2$ to $Me_2O$ is from about 3.0 to about 4.0, and said molar ratio of $SiO_2$ to $B_2O_3$ is from about 7 to about 60.

7. The process in accordance with claim 5 wherein said glyoxal is present in a quantity of from about 0.4% by weight to about 12% by weight, based on the weight of said preparation.

8. The process in accordance with claim 5 wherein said $SiO_2$ is present in a quantity of up to about 30% by weight, based on the weight of said preparation.

9. The process of stabilizing soil comprising contacting said soil with an alkali metal silicate solution comprising water, alkali metal silicate, glyoxal, sodium metaborate and/or potassium metaborate in a molar ratio of $SiO_2$ to $B_2O_3$ of from about 5 to about 400, said alkali metal silicate solution having a molar ratio of $SiO_2$ to $Me_2O$ of from about 2 to about 4.5 wherein Me represents sodium or potassium.

10. The process in accordance with claim 9 wherein said molar ratio of $SiO_2$ to $Me_2O$ is from about 3.0 to about 4.0, and said molar ratio of $SiO_2$ to $B_2O_3$ is from about 7 to about 60.

11. The process in accordance with claim 9 wherein said glyoxal is present in a quantity of from about 0.4% by weight to about 12% by weight, based on the weight of said solution.

12. The process in accordance with claim 9 wherein said $SiO_2$ is present in a quantity of up to about 30% by weight, based on the weight of said solution.

13. The process of stabilizing a mineral building material comprising contacting said building material with an alkali metal silicate solution comprising water, alkali metal silicate, glyoxal, sodium metaborate and/or potassium metaborate in a molar ratio of $SiO_2$ to $B_2O_3$ of from about 5 to about 400, said alkali metal silicate solution having a molar ratio of $SiO_2$ to $Me_2O$ of from about 2 to about 4.5 wherein Me represents sodium or potassium.

14. The process in accordance with claim 13 wherein said molar ratio of $SiO_2$ to $Me_2O$ is from about 3.0 to about 4.0, and said molar ratio of $SiO_2$ to $B_2O_3$ is from about 7 to about 60.

15. The process in accordance with claim 13 wherein said glyoxal is present in a quantity of from about 0.4% by weight to about 12% by weight, based on the weight of said solution.

16. The process in accordance with claim 13 wherein said $SiO_2$ is present in a quantity of up to about 30% by weight, based on the weight of said solution.

17. The process of binding a mineral molding comprising contacting said molding with an alkali metal silicate solution comprising water, alkali metal silicate, glyoxal, sodium metaborate and/or potassium metaborate in a molar ratio of $SiO_2$ to $B_2O_3$ of from about 5 to about 400, said alkali metal silicate solution having a molar ratio of $SiO_2$ to $Me_2O$ of from about 2 to about 4.5 wherein Me represents sodium or potassium.

18. The process in accordance with claim 17 wherein said molar ratio of $SiO_2$ to $Me_2O$ is from about 3.0 to about 4.0, and said molar ratio of $SiO_2$ to $B_2O_3$ is from about 7 to about 60.

19. The process in accordance with claim 17 wherein said glyoxal is present in a quantity of from about 0.4% by weight to about 12% by weight, based on the weight of said solution.

20. The process in accordance with claim 19 wherein said $SiO_2$ is present in a quantity of up to about 30% by weight, based on the weight of said solution.

* * * * *